United States Patent
Ryan

[11] Patent Number: 5,439,271
[45] Date of Patent: Aug. 8, 1995

[54] VEHICLE SEAT WITH EXTRUDED FRAME MEMBERS

[75] Inventor: Thomas M. Ryan, White Lake, Mich.

[73] Assignee: Hoover Universal, Inc., Plymouth, Mich.

[21] Appl. No.: 148,316

[22] Filed: Nov. 8, 1993

[51] Int. Cl.⁶ ............................................. A47C 7/18
[52] U.S. Cl. .................... 297/452.56; 297/452.2; 297/362.12; 297/344.1; 297/218.5
[58] Field of Search ........... 297/452.1, 452.11, 452.18, 297/452.2, 452.48, 452.55, 452.56, 452.59, 354.1, 354.12, 361.1, 362.12, 344.1, 218, 219.1, 228.13, 340–342; 248/429

[56] References Cited

U.S. PATENT DOCUMENTS

| | | |
|---|---|---|
| 3,241,885 | 3/1966 | Deaton . |
| 3,759,572 | 9/1973 | Koepke . |
| 3,874,729 | 4/1975 | Blodee . |
| 3,887,234 | 6/1975 | Curtis et al. . |
| 4,265,483 | 5/1981 | Raftery et al. . |
| 4,597,552 | 7/1986 | Nishino ..................... 297/344.1 X |
| 4,603,907 | 8/1986 | Witzke . |
| 4,630,864 | 12/1986 | Toll ......................... 297/452.1 X |
| 4,702,522 | 10/1987 | Vail et al. .................. 297/452.56 |
| 4,723,816 | 2/1988 | Selbert et al. . |
| 4,828,324 | 5/1989 | Putnam . |
| 5,013,089 | 5/1991 | Abu-Isa et al. ............ 297/452.56 X |
| 5,280,999 | 1/1994 | Jones et al. ................. 297/361.1 |

FOREIGN PATENT DOCUMENTS 535414 1/1957 Canada ..................... 297/452.18

*Primary Examiner*—James R. Brittain
*Assistant Examiner*—Milton Nelson, Jr.
*Attorney, Agent, or Firm*—Harness, Dickey & Pierce

[57] ABSTRACT

A vehicle seat in which the cushion frame is formed by extruded frame members that are extruded as a long rail and then cut to the desired length for the seat assembly. The remaining components of the seat frame are universal and can be used with a seat of any width. The seat structure enables the seat manufacturer to stock a minimum number of components for seats of varying widths and can easily change from production of seats of one width to seats of a different width.

20 Claims, 2 Drawing Sheets

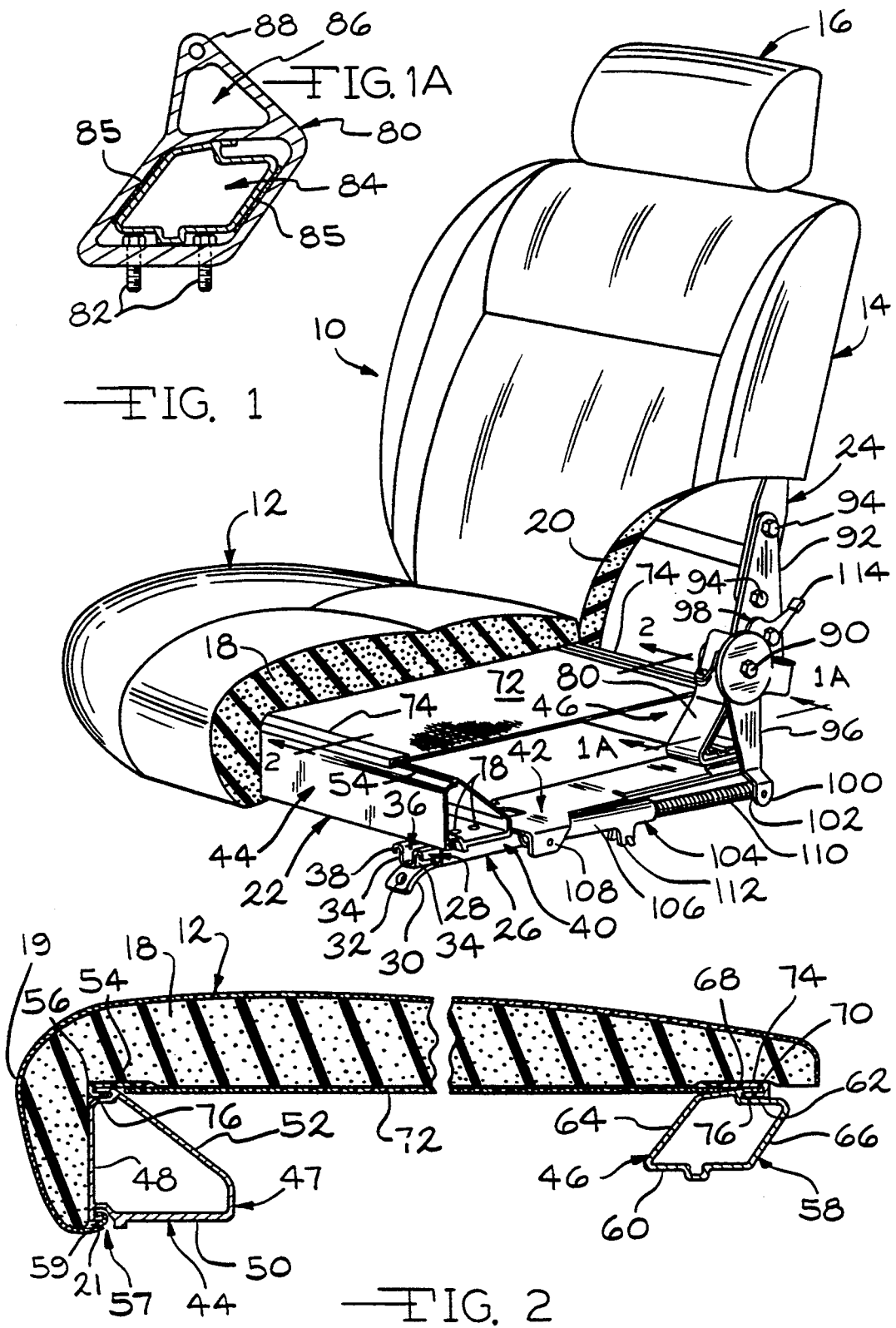

VEHICLE SEAT WITH EXTRUDED FRAME MEMBERS

BACKGROUND AND SUMMARY OF THE INVENTION

The present invention relates to vehicle seats and in particular to seats having elongated frame members made by extrusion, cut to length and assembled to slide rails to reduce the total number of components in the seat and to enable the use of the same components in seats of different widths.

Vehicle seats are typically constructed with a frame having three major components. At the base of the seat, the frame forms a pair of slide tracks with one slide track extending fore and aft along each lateral side of the seat. Each slide track includes a fixed rail mounted to a vehicle body and a slide rail movable fore and aft upon the fixed rail. A latch mechanism is provided to lock the slide rail in an adjusted position. The slide rail may include a riser which extends upwardly for attachment of additional frame components to the slide tracks. In any case, a cushion frame, generally rectangular in shape, is attached to the slide rails and supports a horizontal seat cushion.

The rectangular cushion frame typically carries a web, mat or spring suspension spanning laterally across the frame which in turn supports a foam pad. The suspension transfers the seating load to the side fore and aft extending members of the rectangular cushion frame. A portion of this seating load is then transferred to the front and rear lateral frame members of the cushion frame as a horizontal force component. The horizontal force applied to the front and rear lateral frame members of the cushion frame is contained within the rectangular cushion frame and is not transferred to the slide rails.

A back frame forms the third major component of the seat frame and is attached either to the slide rails or to the rear of the cushion frame. The back frame extends generally upwardly from the cushion frame and is generally rectangular in shape but may taper upwardly. A spring wire suspension extends vertically or horizontally across the frame to support a seat back foam pad. The back frame is often pivotally mounted for rotation about a transverse axis at the lower end of the back frame. A recliner mechanism is provided to lock the back frame in an adjusted position.

The cushion frame is typically formed of several stamped metal components which are welded together to form the rectangular frame. The frame generally includes front and rear laterally extending frame members and left and right fore and aft extending frame members. For each different size seat produced by a manufacturer, different length frame members are needed. A seat manufacturer must produce seats of many different widths. For example, a split bench seat results in two seats, each having a different width. Furthermore, the width of bucket seats will vary depending on the size of the vehicle in which they are installed. The stamped metal frame members are formed at their ends with structures which enable the members to be joined together. For each different width seat, different laterally extending frame members are needed. This results in significant tooling and storage costs for the numerous frame components which must be produced by a full line seat manufacturer.

It is an object of the present invention to reduce the number of frame components in a seat and to increase the number of common components in seats of different sizes.

It is a feature of the present invention to provide a seat structure in which the lateral frame components are manufactured as extrusions with a uniform cross section along their entire lengths. The lateral frame members are cut from long extruded stock to the desired length for the particular seat being assembled. Universal connecting blocks are used to couple the lateral frame members to the fore and aft frame members. Depending upon the width of seats ordered by a customer, the seat manufacturer merely cuts the frame members to the desired length and then assembles the seats. If there is a change in the mix of seat sizes being ordered, little time is required for the seat manufacturer to change tooling to cut different sized frame members and there is no overstock of frame members that are no longer needed. The seat manufacturer is thus better able to support just-in-time delivery of seats to a vehicle assembly plant.

In the case of a seat cushion frame, front and rear frame members are manufactured by cutting the frame members to length from an elongated extruded rail. The ends of the front and rear frame members are directly attached to the slide rails at opposite sides of the seat or connecting blocks are used which are attached to the slide rails and coupled to the front and rear frame members through a telescopic relationship.

A suspension mat or web is mounted to the front and rear frame members. The suspension mat supports a foam pad and upholstery cover. The horizontal seating load applied to the frame members is then transferred to the slide rails rather than transferring this load to separate fore and aft seat cushion frame members. As a result, the number of frame components in a seat assembly is reduced with the slide rails serving as a load carrying member for the horizontal seating loads in the seat cushion frame. The cushion frame is thus integrated with the slide tracks to reduce the number of frame components.

The seat back frame can be similarly constructed with lateral frame members formed by extruded components to enable the frame members to be made of varying lengths depending on the seat width. Upright frame members along the lateral sides of the seat back can be configured to telescopingly connect to the extruded frame members and to use common upright members for a variety of seat widths.

Further objects, features and advantages of the invention will become apparent from a consideration of the following description and the appended claims when taken in connection with the accompanying drawings.

BRIEF DESCRIPTION OF THE DRAWINGS

FIG. 1 is a cut away perspective view of one embodiment of the seat of the present invention;

FIG. 1A is a sectional view of a connecting block used in the seat shown in FIG. 1 to connect the rear cushion frame member to the slide track;

FIG. 2 is an enlarged sectional view of the seat as seen from substantially the line 2—2 of FIG. 1;

DETAILED DESCRIPTION OF THE PREFERRED EMBODIMENT

Figure 3:
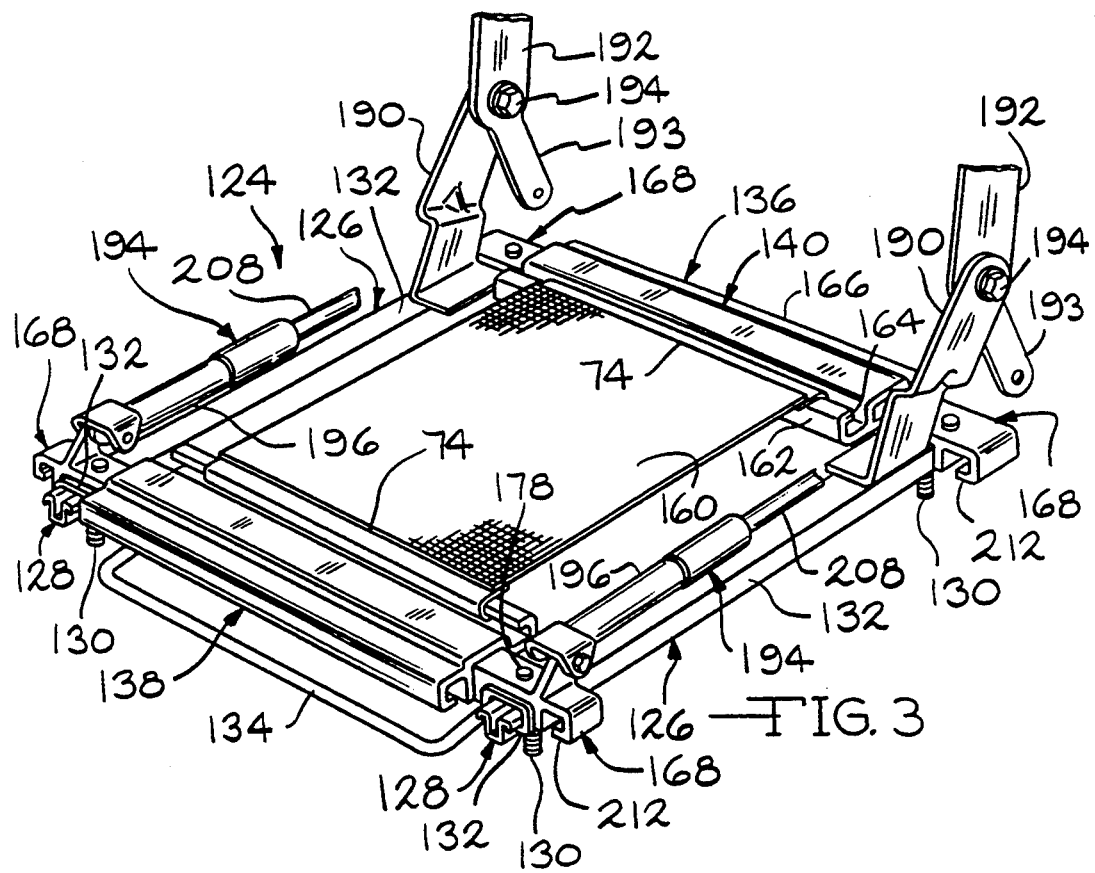
FIG. 3 is a perspective view of a portion of a second embodiment of the present invention.

The seat of the present invention is shown in FIG. 1 and designated generally at 10. Seat 10 includes a generally horizontal cushion section 12 and a back section 14 extending generally upwardly at the rear of the cushion section. A head restraint 16 is positioned at the upper end of the back section. The cushion section and back section include foam pads 18 and 20, respectively. The foam pad 18 is supported by a cushion frame 22 described in greater detail below while the foam pad 20 is supported on a back frame 24. Both the cushion and back frames are carried by a pair of fore and aft extending slide tracks 26 disposed at opposite lateral sides of the seat 10. Only one slide track is shown in FIG. 1.

Slide track 26 includes a fixed rail 28 which is adapted to be rigidly mounted to a vehicle body through a plurality of legs 30, only one of which is shown. Each leg has an aperture 32 for a mounting bolt or other fastener. Fixed rail 28 is generally U-shaped, having a pair of generally upright spaced side walls 34 defining a central channel 36. At the upper ends of the side walls 34, the fixed rail flares outwardly and downwardly forming return bend portions 38.

A generally C-shaped slide rail 40 is carried upon the fixed rail 28 for fore and aft movement thereon by a plurality of roller balls (not shown) disposed within the central channel 36. Such a slide track construction is typical within the vehicle seating art. In the embodiment shown in FIG. 1, a track reinforcement 42 is attached to the top of the slide rail 40 to increase the strength of the slide rail as well as to provide mounting bosses and other features to the slide rail which are difficult to form on the C-shaped slide rail when it is manufactured as a single piece. These features will be described in more detail below.

The cushion frame 22 is comprised of a pair of laterally extending frame members, front frame member 44 and a rear frame member 46. Front frame member 44 has a triangular shaped hollow body 47 having a front wall 48 which is substantially vertical, a lower horizontal wall 50 and an inclined rear wall 52. The front frame member 44 is of a uniform cross section along its entire length enabling it to be extruded as a long rail and subsequently cut to the desired length for the width of the seat 10. Frame member 44 includes a projection 54 which extends from the top of the triangular hollow body 47. The projection 54 terminates in a forward extending mounting flange 56. The lower front corner 57 of the frame member 44, at the juncture of the front wall 48 and lower wall 50, is formed with a rearward extending flange 59.

The rear frame member 46 is in the form of a hollow quadrilateral body 58 having a lower generally horizontal wall 60, an upper generally horizontal wall 62 and inclined front and rear walls 64 and 66. Like the front frame member 44, the rear frame member 46 is also of a uniform cross section along its entire length enabling it to be formed by extrusion as a long rail which is subsequently cut to the desired length for the seat 10. A projection 68 extends from the top wall 62 of frame member 46 and terminates in a flange 70 which extends rearward, away from the front frame member 44.

The foam pad 18 of the cushion section 12 is supported upon a suspension mat 72 which extends fore and aft between the front and rear frame members 44 and 46. The front and rear ends of the suspension mat are sewn or otherwise connected to an elongated clip fastener 74 which extends away from the mat 72 and then forms a bent return portion 76 for coupling to the flanges 56 and 70 formed in the frame members 44 and 46. The mat 72 is sized such that when it is installed on the frame members, the mat is maintained in a taut condition. An upholstery cover 19 covers the foam pad. Cover 19 has an elongated clip fastener 21 at its front edge which is coupled to the rearward extending flange 59 at the bottom of the front frame member 44.

The mat 72 has a slight degree of resiliency such that when an occupant is seated upon the cushion 18, the mat will flex downward between the front and rear frame members. The occupant loading of the mat 72 will result in both a vertical load being applied to the frame members as well as a horizontal load tending to draw the frame members toward each other. This horizontal load is transferred from the frame members to the slide rail 40 on each side of the seat assembly. In contrast with prior rectangular cushion frame configurations, there is no load carrying cushion frame component which connects the front and rear frame members to one another along the sides of the seat.

The seat of the present invention eliminates the fore and aft extending side frame members of the cushion frame and instead transfers the horizontal load component to the slide rails. The slide rails now accommodate this horizontal seating load in addition to moving the cushion section and back section fore and aft relative to the vehicle in which it is installed. The cushion frame and slide rails are thus integrated with one another to reduce the number of components in the seat frame. Instead of having a separate cushion frame which carries all but the vertical seating load, the cushion frame and slide tracks operate together as a unit.

The clip fastener 74 is preferably an elongated extrusion, typically made of plastic. It is possible to use several separate fasteners spaced from one another along the ends of the suspension mat 72 instead of a single elongated fastener extending the entire width of the mat. The continuous fastener 74 has the advantage of evenly distributing the occupant load to the frame members rather than loading the frame members at discrete locations with spaced fasteners.

As mentioned above, the mat 72 will flex downward between the two frame members in response to occupant loading. It is for this reason that the front frame member 44 has a rear wall 52 which is inclined downwardly and rearwardly. Likewise, the front wall 64 of the rear frame member 46 is inclined downwardly and forwardly. Both the front and rear frame members are structural load carrying members to support occupant loading. In addition, the front frame member 44 is particularly adapted to accommodate loading applied during a frontal impact collision in which a seat occupant will be thrust forward and downward. The thighs and buttocks of the occupant will apply a significant load to the front frame member 44.

The front frame member is attached to the slide rail 40 at its ends by fasteners 78. The rear frame member 46 is attached to the slide rail by a connecting block 80 which includes a pivot mount for the seat back and is therefore called a pivot block as well. Pivot block 80 is shown in greater detail in FIG. 1A. Pivot block 80 is also an extruded component having a uniform cross section over its entire length which is approximately equal to the width of the slide rail 40. The pivot block 80 is attached to the slide rail by a pair of fasteners 82.

Pivot block 80 includes a lower hollow channel 84, the inside of which has the same shape and size as the rear frame member 46 so as to enable an end portion of frame member 46 to be telescoped into the pivot block 80. The frame member 46 and pivot block 80 are closely sized so as to enable the use of a structural adhesive 85 to join the rear frame member to the pivot block 80. Similar connecting blocks, having the shape of the front frame member 44, can be used to attach the front frame member to the slide rails in place of the fasteners 78.

The pivot block 80 extends upwardly above the lower hollow channel 84 forming an upper hollow channel 86 and an aperture 88 at its upper end. Aperture 88 is used to rotatably mount the back frame 24 to the slide rail 40. A second identical pivot block 80 is used at the opposite end of rear frame member 46 to attach the frame member to the opposite side slide rail and also to mount the back frame 24.

The back frame 24 is mounted to the pivot block by a pivot bolt 90 extending through the aperture 88 in the pivot block. A mounting bracket 92 is rigidly coupled to the back frame by a pair of nut and bolt assemblies 94. The mounting bracket 92 is in turn connected to the pivot block at aperture 88.

A recliner arm 96 is also mounted to the pivot block for rotation about the bolt 90 and extends downward therefrom. A latch mechanism 98 operates to couple the mounting bracket 92 to the recliner arm 96. When coupled together, the recliner arm 96, mounting bracket 92, and back frame 24 rotate as a unit about the pivot bolt 90. The lower end 100 of the recliner arm is connected to one end 102 of a recliner 104. Recliner 104 is a linear recliner having a locking tube 106 fixed to the track reinforcement 42 at a mounting boss 108. A rod extends rearwardly from the locking tube 106 and is locked in position in the tube. The extending distal end of the rod forms the end 102 of the recliner which is coupled to the recliner arm 96. A coil compression spring 110 surrounds the rod.

A recliner lock mechanism 112 is operable to lock the recliner rod to the locking tube, holding the two in position relative to one another and thus locking the recliner arm 96 in position as well. The recliner lock mechanism is selectively releasable to enable the recliner rod to move within the tube, thus changing the length of the linear recliner 104, causing the recliner arm 96 and back frame 24 to rotate about pivot bolt 90. When the lock mechanism 112 is released, the compression spring 110 tends to urge the rod from the locking tube, causing the back frame 24 to rotate forward. This forward rotation is resisted by the seat occupant who leans into the seat back, against the force of spring 110, until the seat back is in the desired location at which time the lock mechanism 112 is allowed to once again lock. An identical linear recliner 104 is provided at the opposite lateral side of the seat (not shown) and the two recliners are coupled for simultaneous operation to release the seat back.

The latch 98 is selectively releasable by the latch lever 114 to uncouple the back frame from the recliner arm 96. This enables the seat back to be dumped to a forward most rotated position to improve access to the area behind the seat 10 in a motor vehicle. By uncoupling the back frame 24 from the recliner arm 96, the adjusted use position of the seat back is not affected by forward dumping of the seat back. When the seat back is returned to an upright use position, it will lock to the recliner arm in the same position in which the seat back had been adjusted prior to the forward seat back dumping.

The seat 10 shown in FIG. 1 embodies the present invention by utilizing front and rear laterally extending frame members for the cushion frame which are extrusions of aluminum or other metal providing the necessary strength. These frame members are extruded in long rails which are then cut to length to the desired width of the seat 10. Seat 10 as shown is a single passenger bucket seat but could equally as well be a much wider bench seat for a motor vehicle. Common slide tracks 26 can be used for any number of seat widths with only the laterally extending frame members varying in length. This enables a seat manufacturer to provide a broad range of seat widths with a minimal number of seat frame components required. In addition, the typical fore and aft extending side frame members in the cushion frame have been eliminated and the occupant load transferred from the front and rear laterally extending frame members 44 and 46 directly to the slide rails 40.

Figure 4:
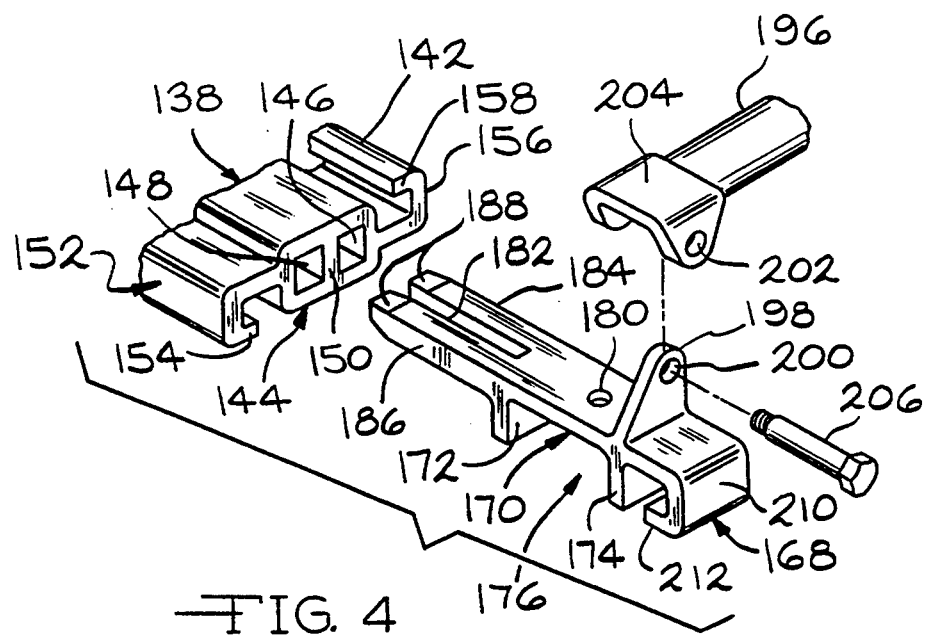
FIG. 4 is an exploded perspective view of a frame member coupling in the cushion frame shown in FIG. 3.

An alternative embodiment of the present invention is shown in FIGS. 3 and 4. Only the cushion frame, slide tracks and lower end of the back frame are shown. Seat 124 includes a pair of laterally spaced slide tracks 126. The slide tracks 126 are similar to the slide track 26 shown in seat 10. The slide tracks each have a fixed rail 128 which includes threaded posts 130 for mounting the slide tracks to a motor vehicle. A C-shaped slide rail 132 is mounted to each of the fixed rails for fore and aft sliding movement. A seat adjuster (not shown) is provided for locking the slide rails to the fixed rails in a conventional manner. Release bar 134 extends laterally across the seat assembly at the front end below the cushion frame for operating the adjuster to release the slide rails and allow fore and aft adjustment of the seat.

The cushion frame 136 of seat 124 includes a front frame member 138 and a rear frame member 140. An end portion 142 of the front frame member 138 is shown in FIG. 4 illustrating the structure of the frame member. Frame member 138 has a center hollow body portion 144 forming two separate channels 146 and 148 which extend the length of the frame member. A wall 150 separates the two channels from one another. Frame member 138 is formed with a front projection 152 which extends forward, then downward, and finally rearward, forming a rearward extending flange 154. A similar rear projection 156 extends rearward from the hollow body portion 144, then upward, and finally forward, forming a forwardly extending flange 158. Frame member 138 is symmetrical about its longitudinal axis.

The rear frame member 140 is identical to the front frame member 138 but has been rotated 180° about a vertical axis relative to the front frame member. The front projection 162 forms a rearwardly extending flange 164 and a rear projection 166 forms a forwardly extending flange (not shown) below the projection 166. The flange 158 of the front frame member and the flange 164 of the rear frame member are used to mount a suspension mat 160 which supports a foam pad. The mat 160 is similar to the suspension mat 72 shown in FIG. 1 and includes an elongated clip fastener 74 at its front and rear ends which couples the mat to the flanges 158 and 164.

The rear facing flange 154 is used to attach an upholstery cover in a similar manner to that shown in FIG. 2. Likewise, the flange formed by projection 166 of the rear frame member 140 is used to attach the upholstery cover at the rear of the seat.

The frame members 138 and 140 are attached to the slide tracks 126 by connecting blocks 168 at the ends of each of the frame members. The connecting blocks 168 have a plate portion 170 from which various mounting features extend. A pair of spaced flanges 172 and 174 extend downwardly from the plate portion 170, forming a cavity 176 for receiving the slide rail 132. A rivet or other fastener 178 is inserted through the aperture 180 in the plate portion to attach the connecting block to the slide rail 132. To one side, beyond the flange 172, the plate portion 170 is machined with a slot 182, dividing the plate portion into a pair of spaced fork tines 184 and 186. The ends of the tines are machined to form tapers 188. The tines 184 and 186 are inserted into the channels 146 and 148 of the frame members 138 and 140. The tines are closely fitted to the channels and are secured therein by structural adhesive.

The front and rear frame members are attached to the slide rails 132 through the use of the connecting blocks 168. As with the seat 10 shown in FIGS. 1 and 2, the horizontal seating load applied to the frame members by the suspension mat 160 will be transferred to the slide rails. The frame members 138 and 140 are formed as extrusions and cut to the desired length for the seat being manufactured. The remaining components of the seat frame are identical regardless of the width of the seat.

Pivot brackets 190 are attached to the slide rails at their rear ends and extend upward, forming a mount for the back frame 192. Pivot bolts 194 are used to attach the back frame to the pivot brackets. The back frame 192 is pivotally mounted for rotation to enable adjustment to a desired reclined position. A recliner arm 193, similar to the recliner arm 96 shown in FIG. 1, is also provided. Linear recliners 194 are provided on each side of the seat and include locking tubes 196 mounted to the front connecting blocks 168 through mounting bosses 198 extending upwardly from the plate portions 170 of the connecting blocks. Aperture 200 in the mounting boss 198 and apertures 202 in the end portion 204 of the locking tube are aligned and receive a bolt 206. A rod 208 extends from the locking tube 196 and is locked therein to secure the seat back in place. The distal end of rod 208 (not shown) is connected to the recliner arm 193 in the same fashion as shown in FIG. 1. By coupling the front end of the recliner 194 to the connecting block 168, the recliner load is transferred to the slide tracks 126 through the front connecting blocks 168. The number of separate attachments to the slide tracks is minimized by using the connecting blocks for the attachments.

The connecting blocks 168 also have an outboard extension 210 which is turned down and then back, forming a flange 212. The flanges 212 can be used for side attachment of the upholstery cover. The connecting blocks 168 are also formed by extrusion and then cut to length. After cutting to length, the slot 182, tapers 188, and aperture 180 are machined into the connecting blocks and the mounting boss 198 is machined to size and aperture 200 is formed.

The seat 124 has the same features as the seat 10 in that the frame members can be cut to any desired length with the remaining components being common among seats of varying widths. The seat of the present invention thus meets the desired objective of the invention and provides the advantages resulting therefrom. While the invention has been described in the context of the cushion frame, it is readily apparent that extruded frame members can be used in the back frame for the laterally extending frame component.

It is to be understood that the invention is not limited to the exact construction illustrated and described above, but that various changes and modifications may be made without departing from the spirit and scope of the invention as defined in the following claims.

What is claimed is:

1. In a vehicle seat having a generally horizontal cushion section and opposite lateral sides;

a frame for said cushion section comprising a pair of elongated laterally extending frame members arranged in a spaced and generally parallel relation with each other, each of said frame members having a pair of ends and being substantially straight between said ends, means connected to and extended between said frame members so as to maintain said frame members in said spaced and generally parallel relation with each other, each of said frame members being hollow and having projection means which extend in a direction away from the other one of said frame members, a load supporting web having ends and extending between said frame members, said web having mounting means secured to the ends thereof for coupling with said projection means to mount said web to said frame members and to maintain said web in a generally taut condition between said frame members, said frame members constituting the sole support for said web on said frame, each of said frame members being of a structural load carrying shape and having a uniform cross section enabling forming of said frame members by extrusion of long members which can be cut into the desired lengths for the frame members of said section.

2. The seat of claim 1 further comprising:

a pair of fore and aft extending slide tracks, one slide track of said pair of slide tracks being disposed on each lateral side of said seat, each slide track including a fixed rail adapted to be mounted to a vehicle body and a slide rail movable fore and aft along said fixed rail; and the ends of said frame members being connected to said slide rails whereby said slide rails form said means connected to and extended between said frame members so as to maintain said frame members in said spaced and generally parallel relation with each other.

3. The seat of claim 1 wherein one of said frame members has an elongated triangular body with three sides with one of said three sides being inclined downwardly and toward said other frame member.

4. The seat of claim 1 wherein one of said frame members has an elongated quadrilateral hollow body having four sides with one of said four sides being inclined downwardly and toward said other frame member.

5. The seat of claim 1 wherein one of said frame members has an elongated hollow body with a pair of channels extending lengthwise therethrough with said channels being separated by a wall.

6. The seat of claim 1 wherein said frame members of said pair of frame members are substantially identical to one another in cross section.

7. In a vehicle seat having a generally horizontal cushion section and spaced lateral sides:

a pair of fore and aft extending slide tracks, one slide track of said pair of slide tracks being disposed on each lateral side of said seat, each slide track including a fixed rail adapted to be mounted to a vehicle body and a slide rail movable fore and aft along said fixed rail;

a cushion frame comprising elongated front and rear frame members extending laterally of said seat in a generally horizontally spaced and generally parallel relation with each other, each of said frame members having a pair of ends and being substantially straight between said ends, means for connecting said frame members at said ends to said slide rails so as to maintain said frame members in said spaced and generally parallel relation with each other, each of said frame members being of a structural load carrying shape having a uniform cross section along the length of said frame members enabling said frame members to be extruded so that long members can be formed and than cut to desired lengths for said frame members; and a load supporting web extending between said frame members and being connected to said frame members, said frame members constituting the sole support for said web on said frame.

8. The seat of claim 7 wherein said front frame member has an elongated triangular hollow body having three sides with one of said three sides being a rear side which is inclined downwardly and toward said rear frame member.

9. The seat of claim 7 wherein said rear frame member has an elongated quadrilateral hollow body having four sides with one of said four sides being a front side which is inclined downwardly and toward said front frame member; and said seat further comprising a pair of connecting blocks, one of said connecting blocks being attached to each of said slide rails and said connecting blocks each having an opening extending therethrough with the ends of said rear frame member being inserted into said opening ends in said connecting blocks and being attached thereto whereby said connecting blocks serve as said means for connecting said frame members to said slide rails with respect to said rear frame member.

10. The seat of claim 7 wherein said front frame member has an elongated triangular hollow body having three sides with one of said three sides being a rear side which is inclined downwardly and toward said rear frame member and said rear frame member has an elongated quadrilateral hollow body having four sides with one of said four sides being a front side which is inclined downwardly and toward said front frame member.

11. The vehicle seat of claim 7 wherein one of said frame members has an elongated hollow body with a pair of channels extending therethrough separated by a wall and further comprising a pair of connecting blocks with one connecting block being attached to each of said slide rails, said connecting blocks each having a forked body with a pair of extending tines with one of said tines being inserted into each of said channels in said one frame member whereby said connecting blocks form said means for connecting said one frame member to said slide rails at said ends of said one frame member.

12. The vehicle seat of claim 7 wherein said front and rear frame members are identical with one another and each frame member has an elongated hollow body with a pair of channels extending therethrough separated by a wall and open at the ends of said frame members, said seat further comprising four connecting blocks with two connecting blocks being attached to each of said slide rails and spaced from one another, said connecting blocks each having a forked body with a pair of extending tines with said tines being inserted into said channels of said frame members through said open ends whereby said connecting blocks form said means for connecting said frame members to said slide rails at said ends of said frame members so as to maintain said frame members in said spaced and generally parallel relation with each other.

13. The seat of claim 7 further comprising a generally upright back section and wherein said means for connecting said frame members to said slide rails includes a pair of connecting blocks, one of said connecting blocks being attached to each of said slide rails and said connecting blocks each having an opening extending therethrough with the ends of said rear frame member being inserted into said openings in said connecting blocks and being attached thereto to connect said rear frame member to said slide rails, said connecting blocks extending upwardly above said rear frame member and forming a mounting boss for attaching said back section to said connecting blocks.

14. The vehicle seat of claim 13 wherein said back section is pivotally mounted for rotation about a pivot axis and further comprising recliner means for holding said back section in an adjusted angular position and for selectively releasing said back section for rotation to change the adjusted angular position of said back section, said recliner means comprising a selectively variable length mechanism having first and second spaced ends, said first end being coupled to said back section at a location spaced from said pivot axis and said second end being coupled to one of said slide rails adjacent to said front frame member by said means for connecting said frame members to said slide rails.

15. The seat of claim 14 further comprising one of said selectively variable length mechanisms disposed along each side of said seat.

16. The seat of claim 7 wherein said means for connecting said frame members at said ends to said slide rails includes a pair of connecting blocks with one connecting block disposed at each end of one of said frame members, said connecting blocks being attached to said slide rails and the ends of said one frame member being coupled to said connecting blocks through a telescopic coupling between said one frame member and said connecting blocks.

17. The seat of claim 16 wherein said connecting blocks are hollow bodies and the ends of said one frame member are disposed within said hollow connecting blocks.

18. The seat of claim 16 wherein said one frame member is an elongated hollow body open at said ends and a portion of each connecting block is telescoped into the open ends of said one frame member.

19. The seat of claim 16 wherein said one frame member is bonded to said connecting blocks by an adhesive.

20. The seat of claim 16 wherein said connecting blocks have uniform cross sections along lengths of said connecting blocks enabling said connecting blocks to be extruded as a long member and cut to desired lengths.

* * * * *